United States Patent [19]

Ross

[11] 3,889,822

[45] June 17, 1975

[54] BAR FEEDER

[75] Inventor: Thomas A. Ross, Mayfield Heights, Ohio

[73] Assignee: Mayfran Incorporated, Mayfield, Ohio

[22] Filed: Mar. 25, 1974

[21] Appl. No.: 454,327

[52] U.S. Cl. .............................................. 214/1.5
[51] Int. Cl. ............................................. B23g 5/22
[58] Field of Search ............... 214/1.1, 1.2, 1.3, 1.4, 214/1.5

[56] References Cited
UNITED STATES PATENTS

| | | | |
|---|---|---|---|
| 2,165,912 | 7/1939 | Whitman | 214/1.5 |
| 3,828,630 | 8/1974 | Argereu | 214/1.5 X |

Primary Examiner—Richard A. Schacher
Attorney, Agent, or Firm—Meyer, Tilberry & Body

[57] ABSTRACT

A bar feeder is provided for intermittently feeding bar stock into the stock receiving opening of a cut-off machine, or the like, while supporting the trailing end of the stock for rotation. The feeder includes a push rod and trough, and the leading end of the push rod is supported in the trough by a separable support member which slides in the trough along with the push rod. When the leading end of the push rod reaches the exit end of the trough, the support member is released. The support member then remains at the exit end of the trough to slidably and laterally support movement of the leading end of the push rod into the inlet end of the machine.

17 Claims, 8 Drawing Figures

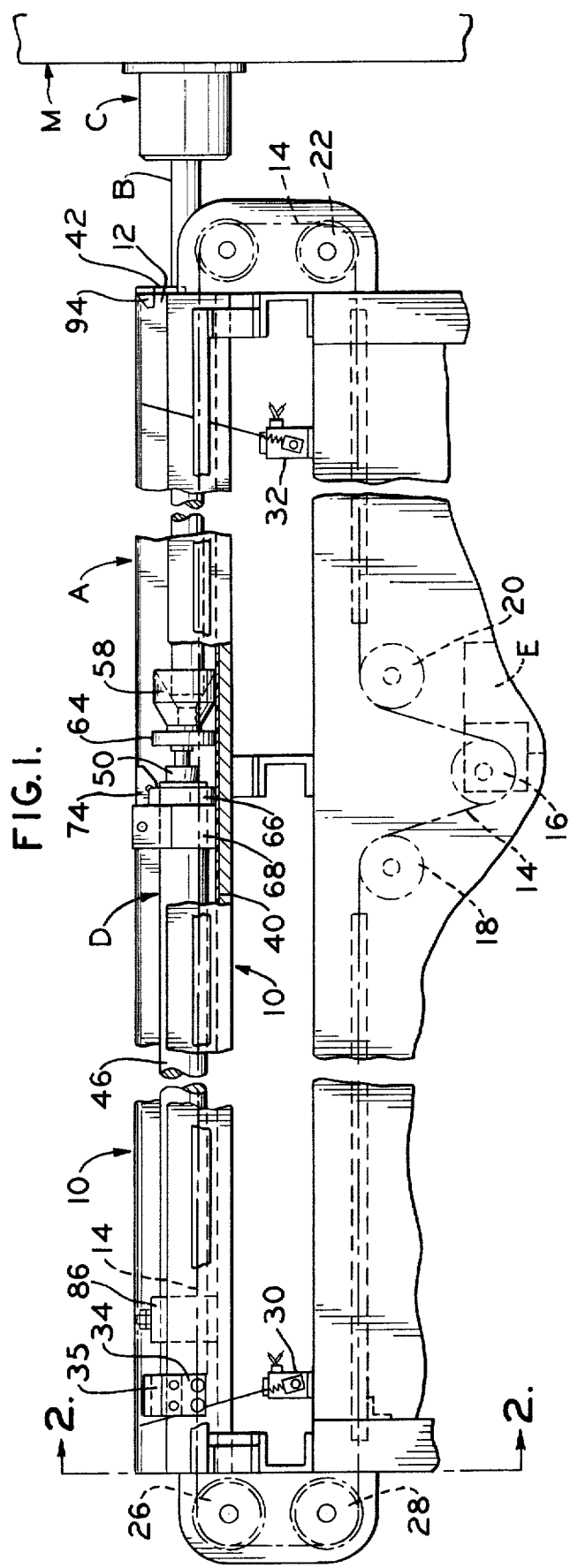
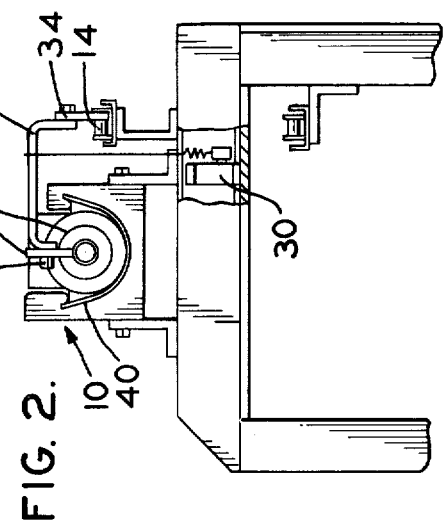

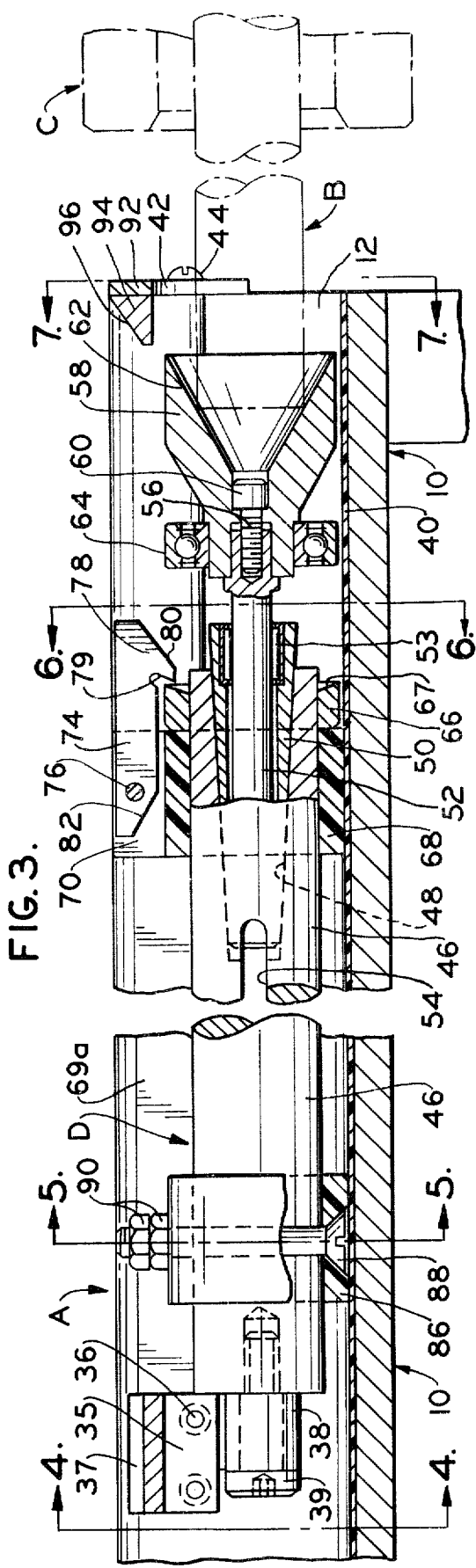
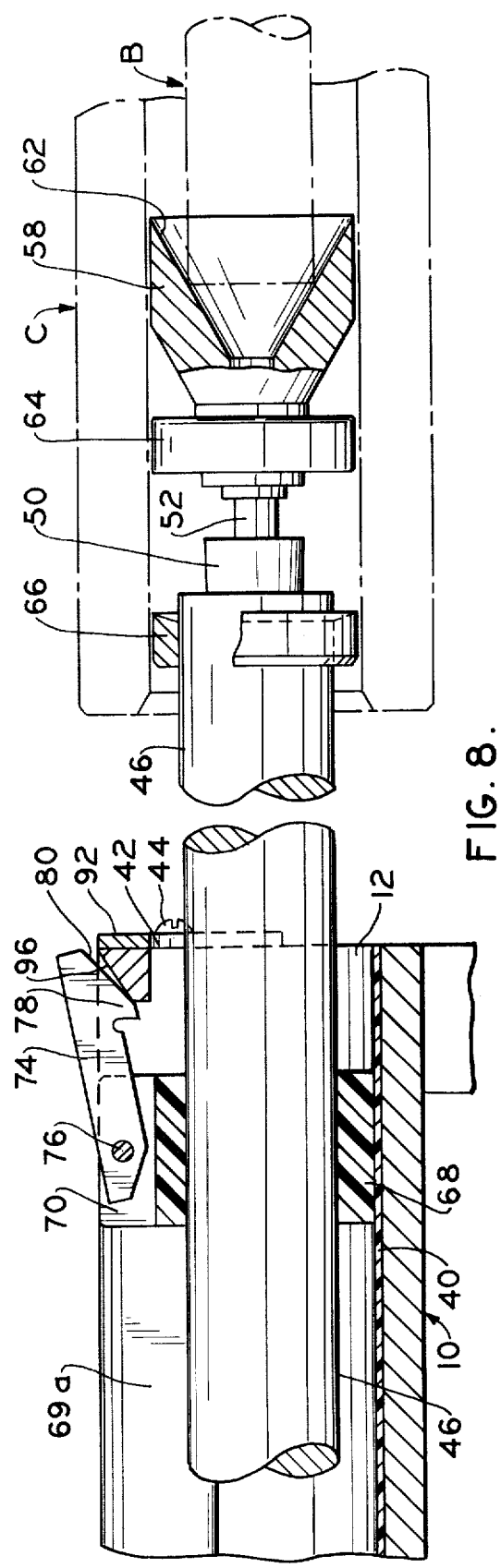

BAR FEEDER

BACKGROUND OF THE INVENTION

This application relates to the art of feed mechanisms and, more particularly, to a bar feeder for feeding elongated bar stock into a machine.

One known type of apparatus for feeding elongated workpieces into a machine is comprised of an elongated trough into which bar stock is loaded. A push rod is slidably received in the trough and engages the rear end of the bar stock to push the leading end of the bar axially forwardly of the trough and into the stock receiving opening of a machine in which work is performed on the bar stock. Feeders of this type generally feed predetermined lengths of bar stock into the machine, pause while the machine operates on that section of bar stock and then feed another section of bar stock into the machine. One such device is the bar feeder disclosed in U.S. Pat. application Ser. No. 322,478 filed Jan. 10, 1973 and assigned to the assignee of the present application, and the disclosure of which earlier application is incorporated herein by reference.

Heretofore, problems have been encountered in supporting the leading end of the push rod, particularly when the leading end extends beyond the discharge end of the feeder. More particularly, the leading end of the push rod tends to sag upon such extension resulting in improper alignment of the push rod and the bar stock with the stock receiving opening of the machine. Such misalignment can cause several problems, one of which is whipping of the push rod about its axis as a result of the bar stock rotation against the leading end of the push rod.

SUMMARY OF THE INVENTION

The present invention provides an improved apparatus for feeding elongated bar stock into the stock receiving opening of a machine and which overcomes the foregoing problems. In accordance with the invention, a push rod capable of extending beyond the discharge end of the feed trough is provided with a support for the front or leading end portion of the push rod when the push rod is extended beyond the discharge end. In the preferred embodiment, the support moves back and forth in the trough as the leading end of the push rod reciprocates therein. When the leading end moves beyond the discharge end of the feed trough, a release is provided so that the support remains at the discharge end of the trough. The push rod then slides in the support so that its leading end is supported cantilever fashion only so far as it extends beyond the discharge end of the feed trough. As the leading end retracts through the support and into the trough, the support is reconnected with the leading end portion and once again slides with the leading end portion within the trough.

It is the principal object of the present invention to provide a self-contained bar feeder where the leading end of the push rod has the maximum possible amount of support.

It is another object of the present invention to have a support for the push rod which moves with the leading end thereof in the feeder and is released from the rod so as to provide a support in which the rod may slide as the rod moves beyond the discharge end of the feeder.

It is also an object of the present invention to provide a bar feeder having an elongated bar receiving member and a push rod which is extendible beyond the receiving member while still having the maximum amount of support for the push rod.

It is a further object of the present invention to provide a reciprocating bar feeder which can maintain accurate alignment of bar stock with respect to a machine into which the stock is fed.

Another object of the invention is a new and improved bar feeder wherein the front portion of the push rod is supported by a sliding support while the front portion reciprocates in the feeder trough and which support is released from the push rod as the rod advances beyond the discharge end of the trough whereafter the rod slides in the support.

BRIEF DESCRIPTION OF THE DRAWINGS

The invention may take form in certain parts and arrangement of parts, a preferred embodiment of which will be described in detail in the specification and illustrated in the accompanying drawings which form a part hereof and wherein:

FIG. 1 is a side elevational view showing a bar feeder constructed in accordance with the present invention;

FIG. 2 is an end elevation view looking in the direction of arrows 2—2 of FIG. 1;

FIG. 3 is a side elevation view, in section, of the trough and push rod components of the feeder shown in FIG. 1;

DESCRIPTION OF A PREFERRED EMBODIMENT

Figure 4:
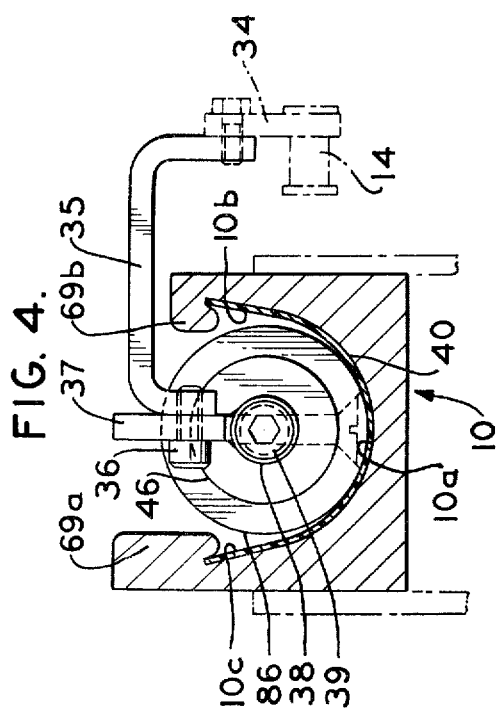
FIG. 4 is an end elevational view looking in the direction of arrows 4—4 of FIG. 3.

Referring now to the drawings, wherein the showings are for purposes of illustrating a preferred embodiment of the invention only and not for purposes of limiting same, FIG. 1 shows a bar feeder A feeding a section of bar stock B into a rotatable collet C defining the entry into a machine M, such as a cut-off machine for example. The bar stock is loaded into the trough 10 of feeder A toward the rear of the trough, appearing on the left in FIG. 1. Stock is fed forwardly out of a discharge opening 12 of trough 10, left to right as shown in FIG. 1. Means for loading bar stock into the trough is not shown in the FIGURES but it is recognized that any known device for rolling, dropping or placing sections of bar stock one at a time in the trough may be used.

Push rod assembly D is reciprocated in trough 10 by chain 14. Chain 14 is driven by a motor and slip clutch assembly E through drive sprocket 16, and is guided through the trough by sprocket wheels 18, 20, 22, 24, 26 and 28. Limit switches 30 and 32 control the extent and direction of travel. Chain 14 is attached to push rod assembly D by a link and bracket assembly including a link member 34 attached to a link of chain 14 and bolted to a U-shaped bracket 35 which is fastened by bolts 36 to a bracket plate 37. Plate 37 is welded or otherwise attached to a support sleeve 38 which is mounted on the rear end of shaft 46 of the push rod assembly by a bolt 39.

Trough 10 has a U-shaped inner surface consisting of a rounded bottom portion 10a and upward side legs 10b, as best shown in FIGS. 4–7. In the preferred embodiment a replaceable plastic liner 40 is fitted to the inner surface of the trough to reduce wear and friction on the surface of the trough and the surfaces of the components of push rod assembly D. Catch plate 42, whose purpose will be explained below, is attached to the forward or front face of trough 10 by bolts 44 and, along with trough 10, defines a discharge opening 12.

As best shown in FIG. 3, the forward end of shaft 46 of push rod assembly D has an axially tapered recess 48 therein to wedgingly receive a collet or bell head member 50. Recess 48 preferably is of frusto-conical contour, and the outer surface of collet 50 is of mating contour and taper with respect to the inner surface of the recess. Collet 50 is axially bored to receive a rod 52, and a suitable bearing 53 supports rod 52 for rotation relative to the collet. Collet 50 and rod 52 are suitably interengaged by bearing 53 or otherwise against relative axial displacement. A slot 54 is provided in shaft 46 to expose the rear end of collet 50, providing access for dislodging the collet therefrom. Rod 52 has a threaded bore 56 at its forward end, and a bar stock pusher member 58 is coaxially mounted on rod 52 by a threaded bolt 60. Pusher member 58 has a forwardly opening conical recess 62. A bearing assembly such as ball bearing unit 64 is positioned around the inner end of pusher member 58. The inner race of the bearing unit is suitably secured to member 58 and the outer race is slightly spaced from liner 40.

Figure 6:
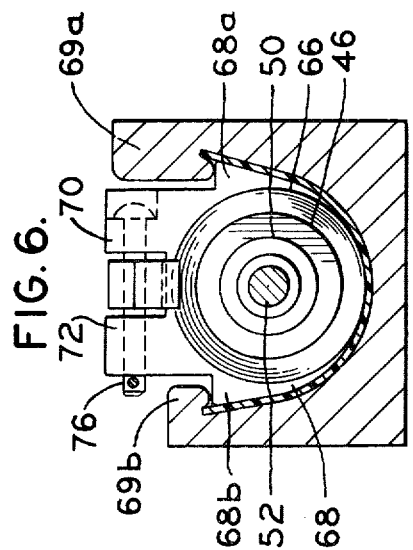
FIG. 6 is a sectional elevation view looking in the direction of arrows 6—6 of FIG. 3.

An annular collar 66 is provided on the forward end of shaft 46 and is suitably interengaged therewith against axial and rotational displacement relative thereto. Shaft 46 is slidably received in a collar 68 which is located behind collar 66 and is slidable along liner 40. The outer periphery of the lower portion of collar 68 corresponds in contour to the U-shaped cross section of trough 10, as best seen in FIG. 6. In the embodiment disclosed, trough 10 has laterally inwardly directed lobes 69a and 69b extending along the top edges of the legs of the trough, and collar 68 is provided with laterally extending shoulders 68a and 68b which are positioned beneath lobes 69a and 69b. These lobes cooperate to hold the collar and push rod assembly in place against displacement relative to the trough and laterally of the push rod axis.

Collar 68 further includes two projections 70 and 72 extending upwardly on opposite sides of a vertical plane intersecting the axis of shaft 46. Projections 70 and 72 are laterally spaced to receive a latch 74 which is pivotally attached thereto by a pin 76. Latch 74 has a nose at the forward end thereof defined by a downwardly extending projection 78 having an upwardly and forwardly tapering front surface 80, the purpose of which will be explained below. The latch further includes an upwardly and rearwardly tapering surface 82 at the rear end thereof. Rear surface 82 limits the amount of pivoting of latch 74 which is possible in a counterclockwise direction, as shown in FIG. 3. Projection 78 of latch 74 is spaced forwardly of pin 76 a distance which provides for collar 66 to be axially captured between projection 78 and collar 68. Accordingly, movement of shaft 46 and collar 66 which is attached thereto causes collar 68 to reciprocate in trough 10 with shaft 46 and collar 66. Preferably, collar 66 has an outwardly opening, slightly conical front face 67 and latch projection 78 has a correspondingly tapered rear surface 79 to ensure proper latching of projection 78 and to prevent accidental unlatching. In the preferred embodiment collar 66 is fabricated from polyethylene plastic.

Figure 5:
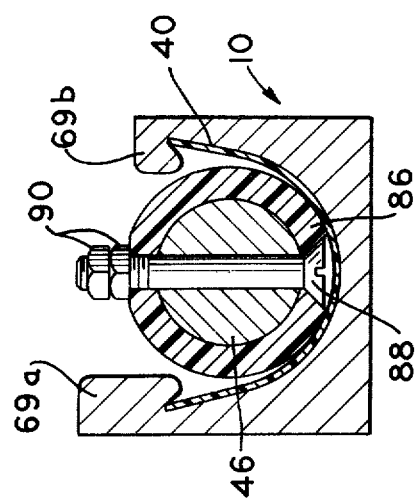
FIG. 5 is a sectional elevation view looking in the direction of arrows 5—5 of FIG. 3.
Figure 7:
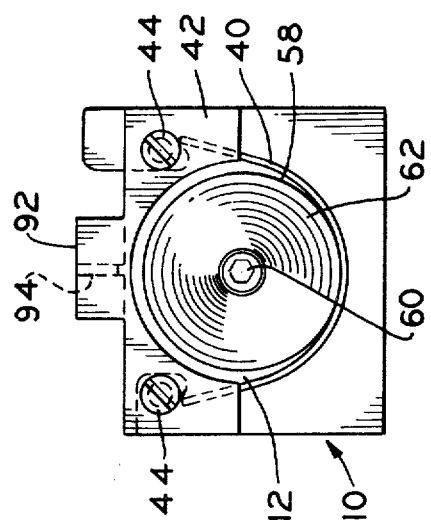
FIG. 7 is an end elevation view looking in the direction of arrows 7—7 of FIG. 3; and, FIG. 8 is a side elevation view, in section, of the trough and push rod member and showing the push rod extended beyond the front end of the trough.

An annular collar 86 is fastened to shaft 46 near the rear end of the shaft. Collar 86 is slidable along lining 40 and is snugly fastened to shaft 46 such as by a bolt 88 and fastening nuts 90, as best shown in FIG. 5. In the preferred embodiment collar 86 is made of polyethylene plastic.

Catch plate 42 at the forward end of trough 10 has an upward extension 92 provided with a rearwardly extending plate 94. Extension plate 94 has a downwardly and rearwardly sloping surface 96 positioned so that it will engage surface 80 of latch 74 as collar 68 approaches its forwardmost position. As surfaces 96 and 80 engage, and collar 68 continues to move forward, latch 74 is pivoted so that nose portion 78 is raised upwardly to horizontally clear collar 66, whereby the collar can move forwardly past the latch and plate 42, as illustrated in FIG. 8.

Operation of the device described above is as follows. In preparing to receive bar stock B of the size to be fed, a subassembly comprised of collet or bell head member 50, rod 52, bearing 64 and pusher member 58 is inserted into the conical recess 48 in shaft 46 and is held snugly in place by frictional engagement of the collet and recess surface. Push rod assembly D is then fully retracted to the left, as shown in FIG. 1, by motor assembly E driving chain 14. When fully retracted, limit switch 30 stops the motor E. A long piece of bar stock B is then loaded into trough 10, and push rod assembly D is driven forward, pushing the leading end of bar stock B through the discharge opening 12 of trough 10 and into the entry of machine M defined by rotatable collet C. As the bar stock enters collet C it is rotated or spun thereby and the trailing end of the bar stock spins up into outwardly opening conical recess 62 on push rod assembly D so that it is centered.

The extent to which bar stock B enters the collet of the cut-off machine is determined by machine C. When a proper section of stock has been fed, collet C grips bar stock B, whereby the bar stock is rotated relative to trough 10 for cutting a length from the end of the bar stock in the machine. When the axial feed of the bar stock is stopped by machine M, the clutch in motor and clutch assembly E begins to slip and the motor continues to run without moving the chain. Thus, push rod assembly D remains in place relative to trough 10 and machine M applying a constant axial force to the end of bar stock B. Moreover, bar stock B is rotating at this time and bearing 53 provides for pusher member 58 and shaft 52 to rotate relative to trough 10. In the event of any lateral force placed on member 58 by the bar stock, bearing 64 can engage the collet to rotatably support the corresponding end of member 58. When collet C opens for machine M to receive another section of bar stock, the clutch of motor and clutch assembly E again engages, thus to move chain 14 and advance push rod assembly D once again toward machine M.

As pusher member 58 approaches discharge opening 12 of trough 10, front surface 80 of latch 74 engages surface 96 of extension plate 94. Further forward motion of the push rod assembly raises latch 74 to disengage collar 68 from collar 66, thus allowing pusher member 58, bearing 64 and collar 66 to advance forward through discharge opening 12 while collar 68 remains at the discharge end of trough 10. During the latter movement, collar 68 slidingly supports push rod assembly D and avoids sagging of the assembly as it moves forwardly out of the trough and into the adjacent end of collet C of machine M, as best shown in FIG. 8. When the push rod assembly reaches its forwardmost position, limit switch 32 is engaged reversing the motor of motor and clutch assembly E, whereby the push rod assembly is displaced back to its retracted position with respect to trough 10.

As collar 66 returns through discharge opening 12 and engages collar 68, collar 68 is pushed toward the rear of trough 10. This results in surface 80 of latch 74 sliding off surface 96 of plate 94, whereby latch projection 78 drops over the front surface of collar 66. Collar 68 is thus latched against collar 66 and slides along the trough to support the push rod assembly until it is once again unlatched at the front end of the trough as described above.

While considerable emphasis has been placed herein on a support member movable with and releaseable from the push rod to support the latter when the leading end extends past the discharge end of the trough, it will be appreciated that other support arrangements and modifications of the arrangement can be devised for achieving the desired support function. Further, it will be appreciated in the arrangement disclosed that the catch defined by the collar fixed on the end of the push rod member can readily be defined by a component other than such a collar. Still further, in connection with the preferred arrangement, it will be appreciated that other latch and catch assemblies and latch actuator components can readily be devised to achieve the desired releaseable interengagement of the support collar and push rod. Accordingly, as many embodiments of the present invention may be made and as many changes may be made in the preferred embodiment herein illustrated and described, it is to be distinctly understood that the foregoing descriptive matter is to be interpreted merely as illustrative of the present invention and not as a limitation.

What is claimed is:

1. In a bar feeder including push rod means, means supporting said push rod means for reciprocable movement between first and second positions, said supporting means having a discharge end and a rear end, said push rod means having a leading end, said leading end in said first and second positions of said rod means being respectively between said rear and discharge ends and beyond said discharge end in the direction from said rear end toward said discharge end, and means to reciprocate said push rod means between said first and second positions, the improvement comprising; a support member releaseably interengageable with said push rod means for movement therewith, said member having a portion interposed between said push rod means and supporting means, and means adjacent said discharge end of said supporting means for releasing said member from said push rod means for said interposed portion to slidably support said push rod means during movement of said leading end between said discharge end and said second position of said push rod means.

2. A bar stock feeder comprising elongate trough means, a push rod supported by said trough means for reciprocation between first and second positions, said trough means having a discharge end and a rear end, said push rod having a leading end and a second end, said leading end in said first position to said push rod being disposed between said discharge and rear ends of said trough means in said second position of said push rod being disposed beyond said discharge end in the direction of movement from said rear end toward said discharge end, push rod support means interposed between said push rod and trough means, said support means including a support member slidable relative to each said trough means and push rod, means releaseably interengaging said support member with said push rod at a location spaced from said leading end for said support member to move with said push rod relative to said trough means, and actuating means at said discharge end of said trough means to disengage said support member and push rod for said push rod to be slidably supported by said support member during movement of said leading end between said discharge end and said second position of said push rod.

3. In a bar feeder including push rod means, means supporting said push rod means for reciprocable movement between first and second positions, said supporting means having a discharge end and a rear end, said push rod means having a leading end, said leading end in said first and second positions of said rod means being respectively between said rear and discharge ends and beyond said discharge end in the direction from said rear end toward said discharge end, and means to reciprocate said push rod means between said first and second positions, the improvement comprising: a support member releaseably interengageable with said push rod means for movement therewith, said member having a portion interposed between said push rod means and supporting means, means adjacent said discharge end of said supporting means for releasing said member from said push rod means for said interposed portion to slidably support said push rod means during movement of said leading end between said discharge end and said second position of said push rod means, said member and push rod means including cooperably interengaging latch and catch means adjacent said leading end, and said means for releasing said member including latch actuator means on said supporting means disengage said latch and catch means during movement of said push rod means from said first position toward said second position.

4. The improvement according to claim 3, wherein said latch and catch means includes a latch on said member and means on said push rod means defining a catch.

5. The improvement according to claim 4, wherein said latch is pivotally mounted on said member and includes a cam surface, said latch actuator means and cam surface interengaging to pivot said latch from engagement with said catch during movement of said push rod means from said first position toward said second position.

6. The improvement according to claim 4, wherein said means defining a catch is a first collar fixed on said push rod means for movement therewith, said member being a second collar on said push rod means and slidable relative thereto, said second collar being disposed on said push rod means behind said first collar with respect to said leading end of said push rod means, said latch axially capturing said second collar relative to said first collar for said second collar to move along said supporting means with said push rod means, and said latch actuator means disengaging said latch from said first collar during movement of said leading end of said push rod means in the direction from said first toward said second position for said collar to slidably support said push rod means during movement of said leading end from said dischage end toward said second position of said push rod means.

7. The improvement according to claim 6, wherein said latch is mounted on said second collar for pivotal movement about an axis transverse to the direction of movement of said push rod means, said latch extending axially across said first collar and having a nose portion radially overlying the side of said first collar facing said leading end to interengage said first and second collars, said nose portion including a cam surface, and said latch actuator means and cam surface interengaging to pivot said latch and displace said nose position radially outwardly from said first collar when said collars reach said discharge end during movement of said push rod means toward said second position.

8. A bar stock feeder comprising elongate trough means, a push rod supported by said trough means for reciprocation between first and second positions, said trough means having a discharge end and a rear end, said push rod having a leading end and a second end, said leading end in said first position of said push rod being disposed between said discharge and rear ends of said trough means and in said second position of said push rod being disposed beyond said discharge end in the direction of movement from said rear end toward said discharge end, push rod support means interposed between said push rod and trough means, said support means including a support member slidable relative to each said trough means and push rod, means releaseably interengaging said support member with said push rod at a location spaced from said leading end for said support member to move with said push rod relative to said trough means, and actuating means at said discharge end of said trough means to disengage said support member and push rod for said push rod to be slidably supported by said support member during movement of said leading end between said discharge end and said second position of said push rod, said means releaseably interengaging said support member and push rod including latch means on said support member and cooperable catch means on said push rod.

9. The feeder according to claim 8, wherein said catch means includes a collar mounted on said push rod for movement therewith, said support member being disposed between said collar and said second end of said push rod.

10. The feeder according to claim 8, wherein said push rod includes a rod member and a pusher member, said pusher member providing said leading end of said push rod, and means interconnecting said pusher member with said rod member and supporting said pusher member for rotation relative to said rod member.

11. The feeder according to claim 10, wherein said support member and catch means are disposed on said rod member, said trough means is generally U-shaped in cross section, said support member surrounds said rod member, and said support member and trough means include means interengaging to prevent lateral displacement of said rod member relative to said trough means.

12. The feeder according to claim 10, wherein said means interconnecting said rod member and pusher member includes shaft means having opposite ends, said pusher member being mounted on one of said opposite ends, and hollow sleeve means receiving and rotatably supporting said shaft means, said sleeve means being releaseably mounted on said rod member.

13. The feeder according to claim 12, wherein said sleeve means has an axially tapered outer surface and said rod member has an axially tapered bore to receive said sleeve means, the tapers of said outer surface and bore being cooperable to frictionally retain said sleeve means in said bore.

14. The feeder according to claim 10, wherein said catch means is a first collar fixed on said rod member for movement therewith, said support member is a second collar surrounding said rod member and disposed on the side of said first collar opposite said leading end of said push rod, said latch means includes an axially extending latch member pivotally supported on said second collar and having a nose portion radially overlying the side of said first collar facing said leading end to interengage said first and second collars, said actuating means pivoting said latch member to displace said nose portion radially outwardly to disengage said first and second collars.

15. The feeder according to claim 14, wherein said nose portion has a cam surface and said actuating means is a cam member engaged by said cam surface to pivot said latch member.

16. The feeder according to claim 15, wherein said trough means is generally U-shaped in cross section and said trough means and second collar have means interengaging to prevent displacement of said push rod laterally relative to said trough means.

17. The feeder according to claim 16, wherein said means interconnecting said rod member and pusher member includes collet means having opposite ends and an axial bore, shaft means supported in said bore for rotation relative to said collet means, said shaft means extending axially from said bore at one of said collet ends and having an outer end spaced from said one end, said pusher member being mounted on said outer end for rotation with said shaft means, and said rod member having an end axially bored to receive the other of said collet ends, and said collet means and said bore in said rod member being cooperably interengagable to frictionally hold said collet means in place with respect to said rod member.

* * * * *